(12) United States Patent
Hinken

(10) Patent No.: US 9,041,237 B2
(45) Date of Patent: May 26, 2015

(54) WIND TURBINE DRIVE TRAIN AND WIND TURBINE

(75) Inventor: Frank Hinken, Rheine (DE)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 13/404,660

(22) Filed: Feb. 24, 2012

(65) Prior Publication Data
US 2013/0221677 A1    Aug. 29, 2013

(51) Int. Cl.
*F03D 9/00* (2006.01)
*F03D 11/00* (2006.01)
*F03D 11/02* (2006.01)

(52) U.S. Cl.
CPC .......... *F03D 11/0075* (2013.01); *F03D 11/028* (2013.01); *F05B 2220/7066* (2013.01); *F05B 2260/40* (2013.01); *Y02E 10/722* (2013.01); *Y02E 10/725* (2013.01)

(58) Field of Classification Search
USPC ........... 439/54–55, 42–44; 290/54–55, 42–44
See application file for complete search history.

(56) References Cited

U.S. PATENT DOCUMENTS

| | | | | |
|---|---|---|---|---|
| 3,883,900 A | * | 5/1975 | Jerard et al. | 623/25 |
| 4,114,057 A | * | 9/1978 | Esters | 310/46 |
| 6,002,187 A | * | 12/1999 | Ohkura et al. | 310/67 A |
| 2013/0280039 A1 | * | 10/2013 | Pasteuning | 415/111 |
| 2013/0285382 A1 | * | 10/2013 | Grigg | 290/54 |

* cited by examiner

*Primary Examiner* — Jean F Duverne
(74) *Attorney, Agent, or Firm* — Global Patent Operation; Douglas D. Zhang

(57) ABSTRACT

A wind turbine drive train is provided. The wind turbine drive train includes a hub, a bearing system supporting the hub and having an inner race connected to the hub, and a generator gearlessly coupled to the inner race using a flexible coupling member.

18 Claims, 5 Drawing Sheets

WIND TURBINE DRIVE TRAIN AND WIND TURBINE

BACKGROUND OF THE INVENTION

The subject matter described herein relates generally to wind turbines and to drive trains for wind turbines, and more particularly, to direct-drive trains of wind turbines and wind turbines with direct-drive trains.

At least some known wind turbines include a tower and a nacelle mounted on the tower. A rotor is rotatably mounted to the nacelle and is coupled to a generator by a shaft. A plurality of blades extends from a rotor. The blades are oriented such that wind passing over the blades turns the rotor and rotates the shaft, thereby driving the generator to generate electricity.

Some wind turbines utilize geared drive trains to connect the turbine blades to the electrical generators. The wind turns the blades mounted to a wind turbine rotor, which spin a low speed shaft, which feeds into a gearbox having a higher speed output shaft. This higher speed output shaft connects to a generator for producing electric power. The geared drive aims to increase the velocity of the mechanical motion.

Another type of wind turbines uses a gearless drive train which is also known as direct-drive train. In direct-drive train design, the wind turbine rotor and the generator are directly connected by a main shaft. Compared to geared drive trains, direct-drive trains required fewer components. Thus, wind turbines with direct-drive train are expected to be even more reliable. This is particularly important for offshore wind turbines where maintenance tends to be more costly. Direct-drive generators such as a synchronous generator operate at the same speed as the wind turbine rotor. Therefore, direct-drive generators are typically larger than the generators used in geared drive trains. Therefore, designing the structure for supporting the main shaft and the generator of direct-drive trains may require special consideration. Typically, a long main shaft transmits a torque between the wind turbine rotor and the generator and is supported by two bearings to effectively transfer non-rotational loads to a bed plate structure arranged in the nacelle. In this design, the long main shaft has to carry torque and bending loads and is thus comparatively heavy and expensive.

In view of the above, there is need for improved direct-drive trains for wind turbines.

BRIEF DESCRIPTION OF THE INVENTION

In one aspect, a wind turbine drive train is provided. The wind turbine drive train includes a hub, a bearing system supporting the hub and having an inner race which is connected to the hub, and a generator gearlessly coupled to the inner race using a flexible coupling member.

In another aspect, a direct-drive train of a wind turbine is provided. The direct-drive train includes a hub, a single rotary bearing supporting the hub, and a direct-drive train generator having a generator rotor connected to the hub.

In yet another aspect, a wind turbine is provided. The wind turbine includes a rotor including a hub and at least one rotor blade mounted to the hub, a bedplate, a bearing system mounted to the bedplate and supporting the hub, and a generator having a generator rotor coupled to the bearing system using a flexible coupling member.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a direct-drive train using a flexible coupling for connecting the main shaft or an inner bearing race to the generator rotor and a wind turbine system with such a direct-drive train. Accordingly, the main shaft may be shortened compared to other direct-drive trains or even saved by using the inner bearing race as a hollow axle to which the hub is mounted. This allows both saving costs and weight. More specifically, the drive train uses a single bearing for supporting the hub and the main shaft, respectively. Accordingly, number of components of the drive train is reduced. Thus, maintenance cost may be saved.

As used herein, the term "flexible coupling" is intended to be representative of a coupling that is adapted to torque between two shafts even when the two shafts are slightly misaligned or displaced with respect to each other. The flexible coupling is typically designed to transmit torque while permitting some radial, axial, and/or angular misalignment. Flexible couplings can typically accommodate angular misalignment up to a few degrees, an axial misalignment of up to a few mm and a radial displacement which corresponds allowable angular misalignment and axial extension of the flexible coupling. For example, the flexible couplings may accommodate varying degrees of angular misalignments of up to about 2° or up to about 4° and an axial misalignment of up to about +/−4 mm or up to about +/−8 mm. However, the values may depend on the coupling type. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "direct-drive generator" is intended to be representative of any device that generates electrical power from rotational energy generated from wind energy and is configured to operate at the same speed as the wind turbine rotor.

Figure 1:
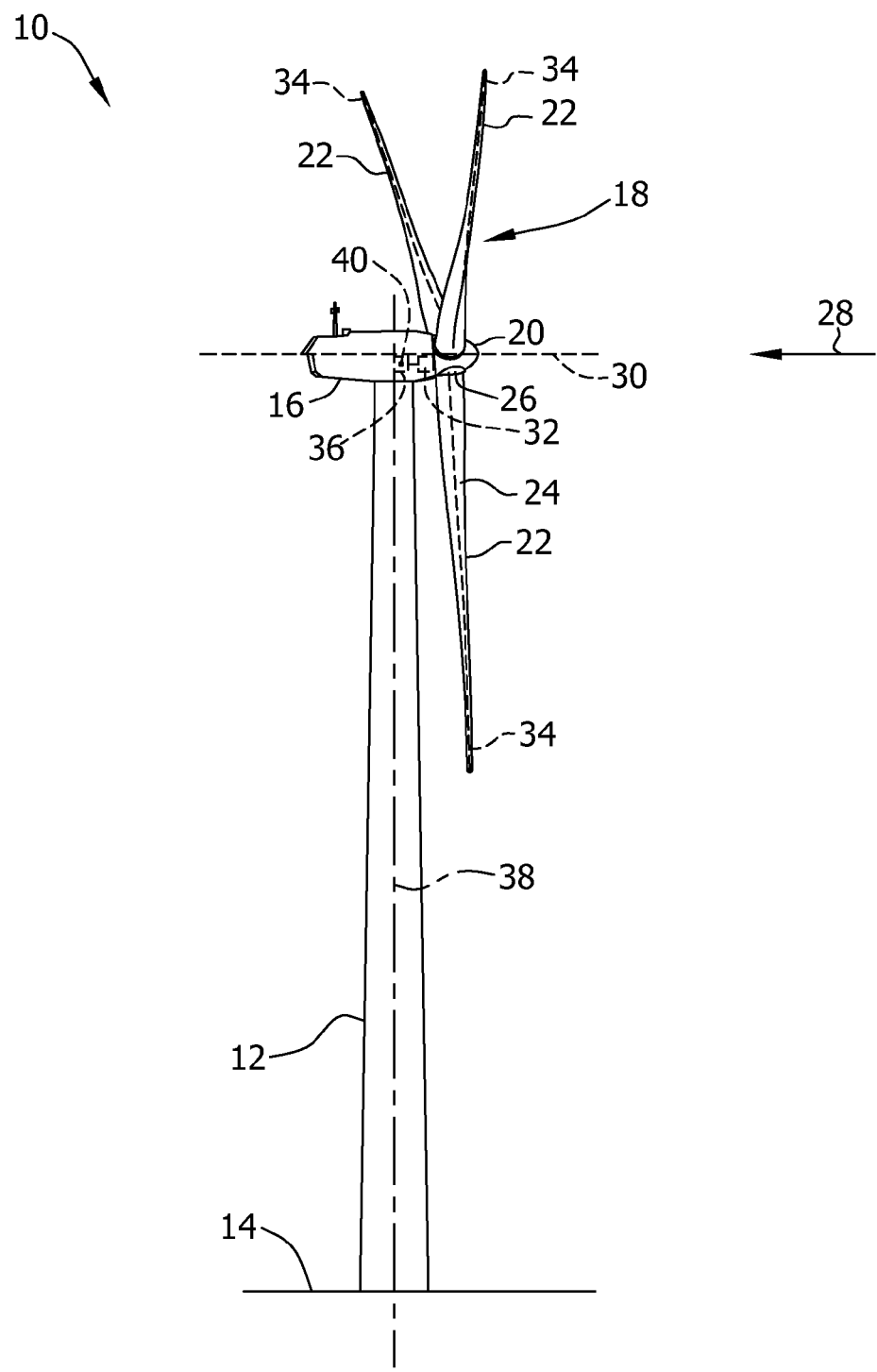
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
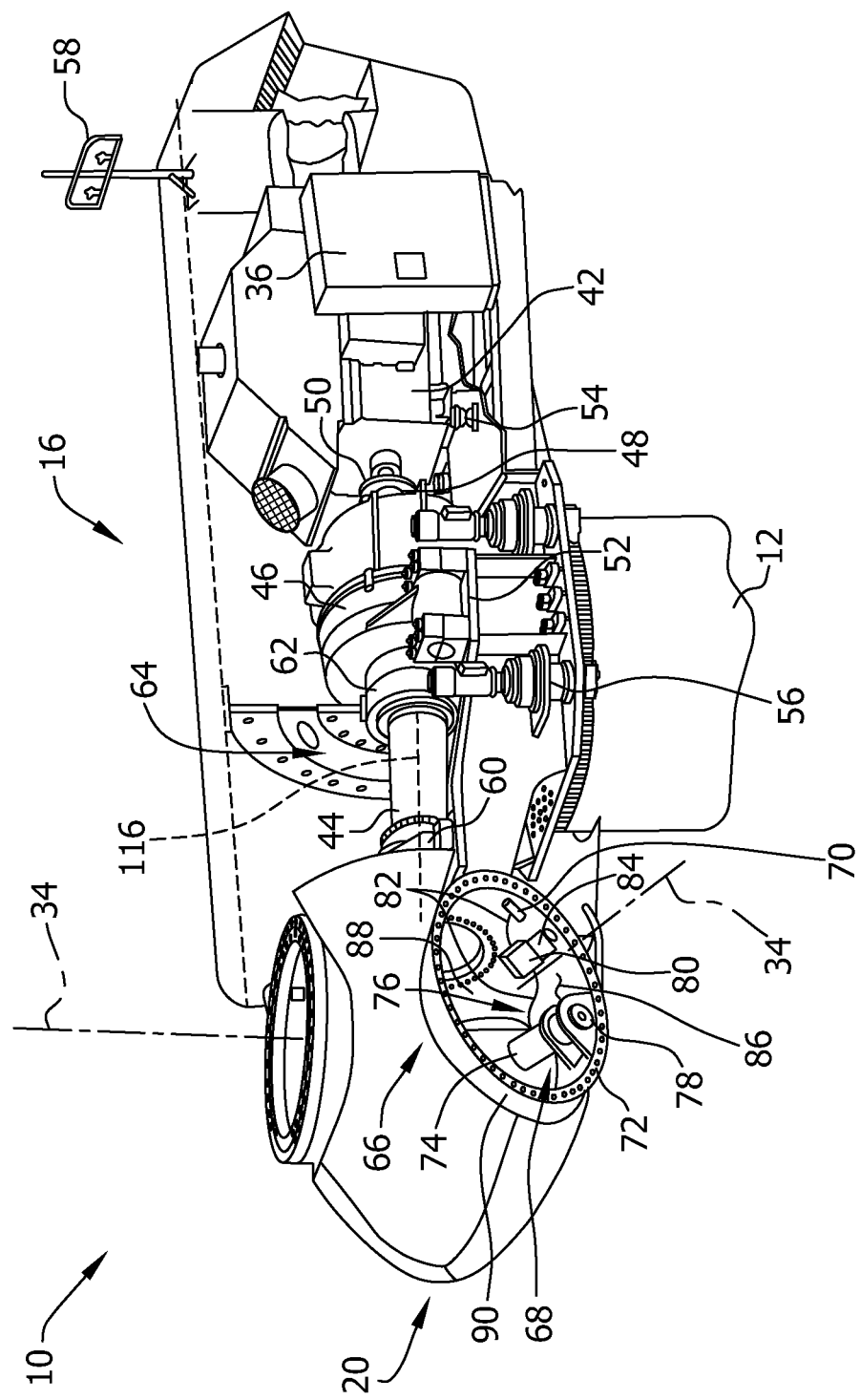
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64, in the example as geared drive train.

In other examples, geared drive train 64 is replaced by a direct-drive train. For example, a comparatively long main shaft connects hub 20 and generator 42. Main shaft and generator shaft are typically coupled via a conical sleeve coupling. Main shaft is typically supported by a front bearing, for example a spherical roller bearing, next to hub 20 and a rear bearing, for example a CARB bearing, next to generator 42. The front bearing and the rear bearing are connected to a bedplate and configured to transfer axial loads and bending loads to the bedplate mounted to nacelle 16. The generator is hanging on the main shaft. Further torque beams may be provided between the generator and the bedplate to transfer torque to the bedplate during operation of the wind turbine.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
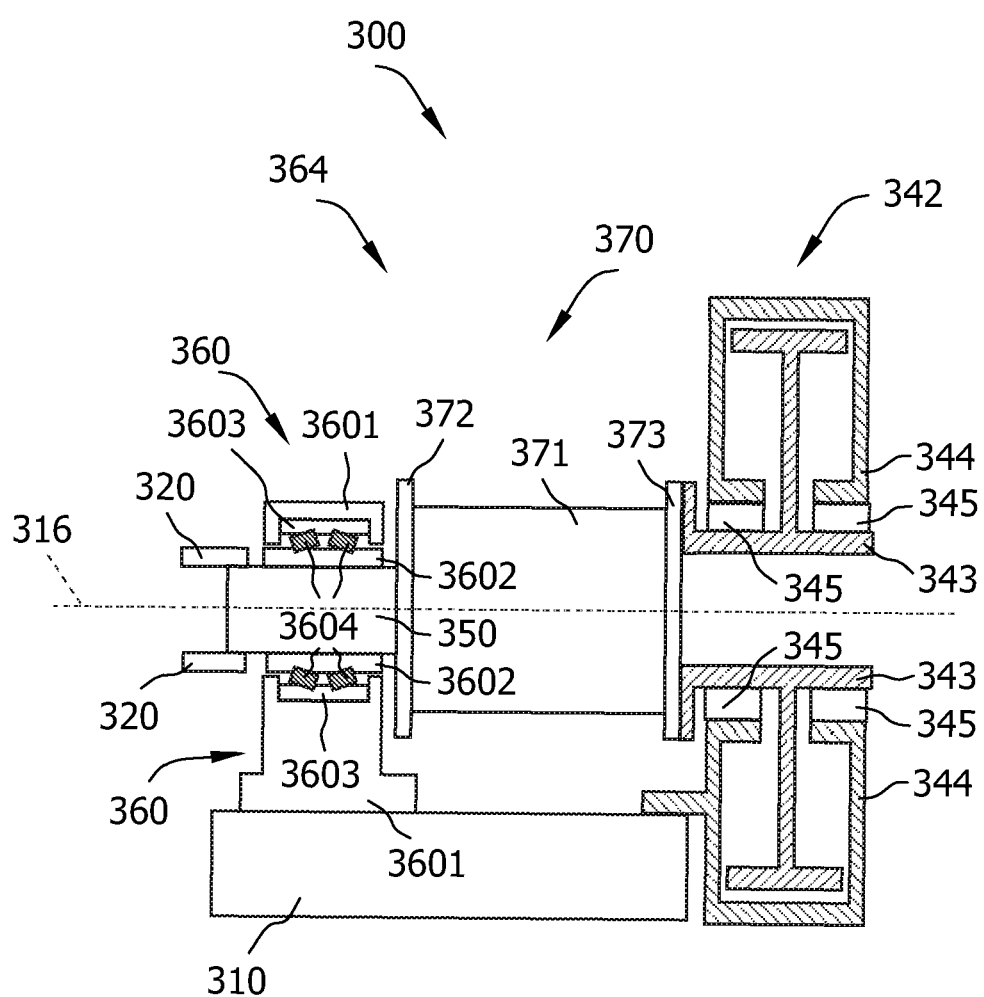
FIG. 3 is a sectional view of a drive train of a wind turbine according to an embodiment.

FIG. 3 is a sectional view of a drive train 364 of a wind turbine 300. Wind turbine 300 is similar to the wind turbine 10 explained above with regard to FIGS. 1 and 2, but a direct-drive train wind turbine. Accordingly, drive train 364 of wind turbine 300 is a direct-drive train without a gearbox. A main shaft 350 is used to transmit the torque from a rotor 318 to a direct-drive generator 342. In the following, main shaft 350 and direct-drive train 364 are also referred to as shaft 350 and drive train 364, respectively. Similar as explained above with regard to FIG. 1, rotor 318 includes a hub 320 and one or more rotor blades (not shown in FIG. 3) mounted to hub 320. For sake of clarity, only a connecting portion of hub 320 connected to shaft 350 is shown in FIG. 3.

According to an embodiment, wind turbine 300 and drive train 364, respectively, include a bedplate 310 typically arranged inside and fixed to the nacelle (not shown in FIG. 3) of wind turbine 300. Furthermore, a bearing system 360 supporting shaft 350 is mounted to bedplate 310.

According to an embodiment, bearing system 360 is formed by a single rotary bearing 360, typically an annular rotary bearing. Rotary bearing 360 includes a bearing housing 3601 attached to bedplate 310, an outer race or outer ring 3603 connected to bearing housing 3601, an inner race or inner ring 3602 supporting shaft 350, and rollers 3604 arranged between inner race 3602 and outer race 3603.

In the exemplary embodiment, rotary bearing 360 is a double way tapered roller bearing. Tapered roller bearings support both radial bending and axial loads, and typically can carry higher loads than e.g. ball bearings due to greater contact area. Furthermore, rotary bearing 360 is typically a prestressed bearing to ensure high enough holding forces.

According to an embodiment, rotary bearing 360 is configured to substantially take the loads of shaft 350 during normal operation of wind turbine 350. For example, rotary bearing 360 is configured to take forces of at least about 5.000 kN, more typically of at least about 10.000 kN or even at least about 20.000 kN in axial direction 316 and/or in radial direction. For example, rotary bearing 360 may be configured to take combined radial and axial static loads of about 40.000 kN and about combined radial and axial dynamic loads of about 15.000 kN. Axial direction 316 in FIG. 3 corresponds to rotational axis of rotor 316 and shaft 350, respectively. Furthermore, axial direction 316 corresponds to an axial direction of the rotary bearing 360 since the outer race 3602 and shaft 350 coaxially mounted to each other.

According to an embodiment, drive train 364 further includes a generator 342 having a generator stator 344 non-rotatably attached to bedplate 310 and a generator rotor 343. Generator rotor 343 is rotatably mounted using generator bearings 345 arranged between generator rotor 343 and generator stator 344.

According to an embodiment, generator rotor 343 is connected to the hub 320 via a flexible coupling 370 mounted between shaft 350 and generator rotor 34. Flexible coupling 370 is typically mounted co-axially with respect to generator rotor 343 and shall 350.

In the exemplary embodiment, flexible coupling 370 includes a substantially stiff torque tube 371, a first flexible element 372 arranged at a first end of torque tube 371 and between the shaft 350 and torque tube 371 and a second flexible element 373 arranged at second end an opposite to the first and between torque tube 371 and generator rotor 343. Typically, the flexible coupling 370 is a multi-plate clutch.

Generator 343 is coupled without a gearbox to shaft 350 and rotor 318, respectively. Accordingly, generator 343 is a direct-drive train generator, for example a synchronous generator, configured to operate at the same speed as rotor 318.

Due to coupling generator rotor 343 via a flexible coupling 370 to shaft 350 supported by rotary bearing 360 fixed to bedplate 310, the torque of rotor 318 is, during operation of wind turbine 300, transmitted over inner bearing race 3602 to flexible coupling 370 and to generator rotor 343. Furthermore, rotary bearing 360 is configured to substantially take the loads in axial and radial direction, typically more than about 99% of the maximum non-rotational loads expected during operation of wind turbine 300. The maximum non-rotational loads may correspond to high wind speeds and or a gust.

Heavy non-rotational loads, for example during a gust, may result in an angular, a radial and/or an axial misalignment between rotor 318 and generator rotor 343. However, the generator stator 344 is typically also fixed to bedplate 310 and any angular, radial and axial misalignment between inner bearing race 3602 and generator rotor 343 is substantially absorbed by flexible coupling 370.

In other words, bearing 360 is configured to transfer at least a major part of maximum expected radial and axial loads to bedplate 310, and the flexible coupling 370 is configured to transmit a torque between shaft 350 and rotor 318, respectively, and generator rotor 342. Furthermore, flexible coupling 370 is configured to compensate radial, axial, and angular misalignments between shaft 350 and rotor 318, respectively, and generator rotor 343.

During normal operation of wind turbine 300, only the torque generated by rotor 318 is typically transmitted to generator rotor 343. Compared to other direct-drive train concepts, drive train 364 is typically less expensive and more maintenance-friendly, as it requires less and/or lighter and/or less expensive components. Firstly, drive train 364 has typically only one bearing 360. Accordingly, maintenance costs may be saved. Secondly, drive train 364 uses a flexible coupling 370. Accordingly, shaft 350 is typically shorter, less weight and cheaper than a main shaft supported by two bearings one of which is close to the rotor and the other close to the generator. Furthermore, generator rotor 343 may be easily fixed to flexible coupling 370, for example screwed. Accordingly, a shrinking coupling between the main shaft and the generator is not required. Even further, the shaft 350 may be saved and thus costs further reduced. This is explained in the following.

Figure 4:
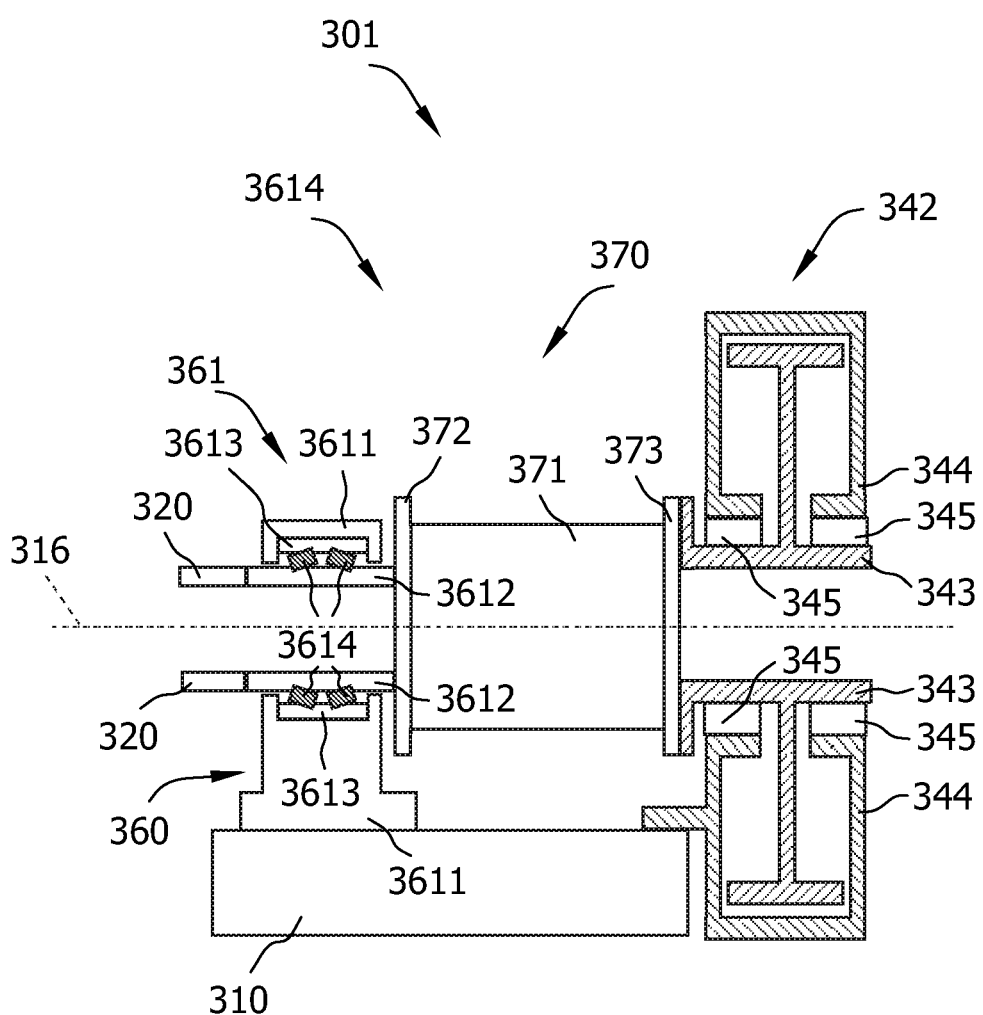
FIG. 4 is a sectional view of a drive train of a wind turbine according to an embodiment.

FIG. 4 is a sectional view of a drive train 3614 of a wind turbine 301. Wind turbine 301 and drive train 3641 are similar to the wind turbine 300 and drive train 364 explained above with regard to FIG. 3. However, hub 320 is directly mounted to an inner race 3612 of a bearing 361 mounted with its housing 3611 to bedplate 310. Rotary bearing 361 is typically an annular rotary bearing and includes an outer race 3613 connected to bearing housing 3611, an inner race 3612, and rollers 3614 arranged between inner race 3612 and outer race 3613. Further, generator rotor 343 is gearlessly coupled to inner race 3612 by flexible coupling 370 and flanges. Accordingly, inner race 3612 is used as hollow axle to which hub 320 is directly mounted and to which the generator rotor 343 is connected via the flexible coupling 370. Accordingly, an additional shaft is saved and thus number of components and manufacturing costs of drive train 3614 are reduced.

According to an embodiment, the wind turbine drive train 3614 includes a hub 320, a bearing system 361, typically a single bearing, supporting hub 320 and having an inner race 3612 to which hub 320 is directly mounted, and a generator 342 having a generator rotor 343 which is gearlessly coupled to inner race 3612 using flexible coupling 370.

In the embodiments explained above with regard to FIG. 3, the wind turbine drive train 364 includes a hub 320, a shaft 350 torsionally stiff connected to hub 320, a bearing system 360, typically a single bearing, supporting shaft 350, and a generator 342 having a generator rotor 343 which is gearlessly coupled to shaft 350 by flexible coupling 370. Typically, bearing system 360 includes an inner race 3602 supporting shaft 350.

The embodiments explained with regard to FIGS. 3 and 4 have in common, that the wind turbine drive train includes a hub, a bearing system, typically a single bearing, supporting the hub and having an inner race torsionally stiff connected to the hub, and a generator gearlessly coupled to the inner race using a flexible coupling.

Figure 5:
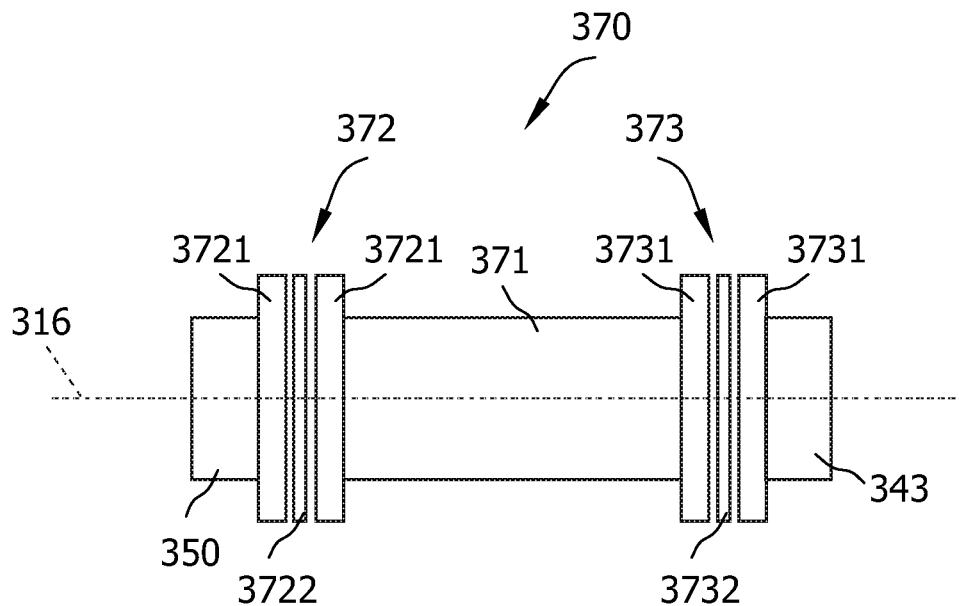
FIGS. 5 and 6 are enlarged sectional views of the drive train illustrated in FIG. 3 according to embodiments.
Figure 6:
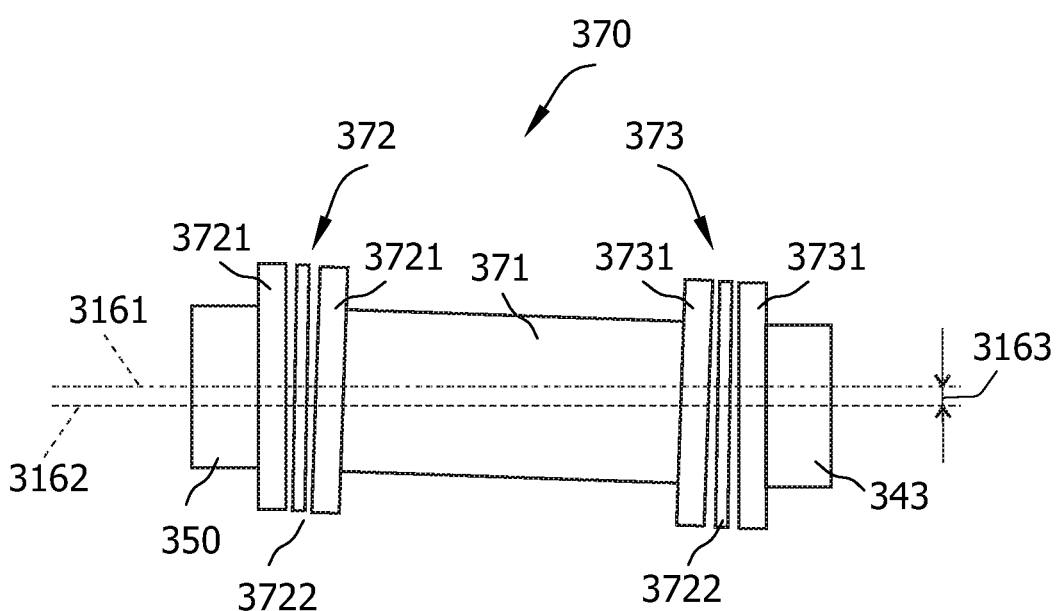

FIGS. 5 and 6 are enlarged sectional views of the drive train illustrated in FIG. 3 according to embodiments. It goes without saying that the embodiments explained with regard to FIGS. 5 and 6 may also refer to the drive train explained with regard to FIG. 4. FIG. 5 schematically illustrates a typical situation during operation with medium or low non-rotational loads acting on shaft 350. Accordingly, shaft 350, flexible coupling 370 and generator rotor 343 are substantially coaxial to each other. In other words, rotor axis 316 of shaft 350 and hub, respectively substantially matches rotor axes of generator rotor 343 and flexible coupling 370.

In the exemplary embodiment, flexible coupling 370 is a multi-plate clutch. Accordingly, the first flexible element 372 and the second flexible element 373 fixed to opposite ends of torque tube 371 include respective plates or discs 3722, 3732, typically a plurality of plates 3722, 3732 between respective pairs of end plates 3721, 3731.

The schematic drawing of FIG. 6 illustrates a situation in which the rotor axis of shaft 350 is displaced in radial direction with respect to the rotor axis of generator rotor 343, for example due to a gust. As can be seen, flexible coupling 370 compensates the relative motion between generator rotor 343 and shaft 350 and the bearing (not shown in FIG. 6), respectively. Furthermore, flexible coupling 370 typically transfers only comparatively low radial and axial forces to generator rotor 343 as a significant portion of the forces is, in an event of misalignment and/or displacement, absorbed by the first and second flexible elements 372, 373 having an appropriate spring stiffness.

Accordingly, flexible coupling 370 is designed to transmit torque while permitting some radial, axial, and/or angular misalignment. Typically, flexible coupling 370 can accommodate angular misalignment up to a few degrees, for example up to about 2° per disk package multi-plate clutch, and some misalignment in axial and radial direction. For example, flexible coupling 370 may accommodate an axial misalignment of up to about +/−4 mm, more typically of up to about +/−8 mm. The allowable a radial displacement depend on the axial extension of flexible coupling 370, i.e. length of torque tube 371. For example, the flexible coupling 370 may accommodate a radial displacement of up to about 52 mm for a 1.5 m long torque tube 371 and an allowable angular misalignment of about 2°.

The above-described systems facilitate less complex direct-drive trains of wind turbines resulting in less expensive and/or more maintenance-friendly drive trains. More specifically, only a single bearing and a shorter shaft connected to the hub is used. The shaft may even be saved when an inner race of a bearing is used as axle to which the hub is mounted. Thus maintenance costs and production costs, respectively, may be saved.

Exemplary embodiments of systems for drive train of wind turbines are described above in detail. The systems are not limited to the specific embodiments described herein, but rather, components of the systems may be utilized independently and separately from other components described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine drive train, comprising:
a hub;
a bearing system supporting the hub and comprising an inner race connected to the hub;
a generator; and
a flexible coupling member coaxially mounted between the hub and the generator and gearlessly coupling the generator to the inner race, wherein the flexible coupling member comprises a torque tube and at least one of a first flexible element arranged between the inner race and the torque tube and a second flexible element arranged between the generator and the torque tube.

2. The drive train of claim 1, wherein the inner race is torsionally stiff connected to the hub.

3. The drive train of claim 1, wherein the hub is mounted to the inner race.

4. The drive train of claim 1, further comprising a shaft mounted to the hub and supported by the inner race.

5. The drive train of claim 1, wherein the generator comprises a rotational axis, wherein the hub comprises a rotational axis, and wherein the flexible coupling member is configured to transmit a torque between the hub and the generator and to compensate a radial, an axial, or an angular misalignment between the rotational axis of the hub and the rotational axis of the generator.

6. The drive train of claim 1, wherein the flexible coupling member is a multi-plate clutch.

7. The drive train of claim 1, further comprising a bedplate supporting the bearing system.

8. The drive train of claim 7, wherein the generator comprises a generator rotor co-axially mounted to the flexible coupling member and a generator stator attached to the bedplate.

9. The drive train of claim 1, wherein the bearing system is formed by a single rotary bearing.

10. A direct-drive train of a wind turbine, comprising:
a hub;
a single rotary bearing supporting the hub; and
a direct-drive train generator comprising a generator rotor connected to the hub; and
a flexible coupling member coaxially mounted between the hub and the generator and connecting the generator rotor to the hub; wherein the flexible coupling member comprises a torque tube and at least one of a first flexible element arranged between the hub and the torque tube and a second flexible element arranged between the generator and the torque tube.

11. The direct-drive train of claim 10, wherein the generator rotor comprises a rotational axis, wherein the hub comprises a rotational axis, and wherein the flexible coupling is configured to transmit a torque between the hub and the generator and to compensate a radial, an axial, or an angular misalignment between the rotational axis of the hub and the rotational axis of the generator.

12. The direct-drive train of claim 10, wherein the single rotary bearing is a pre-stressed annular roller bearing or a pre-stressed annular ball bearing.

13. The direct-drive train of claim 10, wherein the generator comprises a generator stator, further comprising a bedplate to which the single rotary bearing and the generator stator are mounted.

14. The direct-drive train of claim 10, wherein the direct-drive train generator is a synchronous generator.

15. A wind turbine comprising:
- a rotor comprising a hub and at least one rotor blade mounted to the hub;
- a bedplate;
- a bearing system mounted to the bedplate and supporting the hub;
- a generator comprising a generator rotor coupled to the bearing system; and
- a flexible coupling member coaxially mounted between the hub and the generator and connecting the generator rotor to the bearing system; wherein the flexible coupling member comprises a torque tube and at least one of a first flexible element arranged between the hub and the torque tube and a second flexible element arranged between the generator and the torque tube.

16. The wind turbine of claim 15, wherein the bearing system is formed by a single annular rotary bearing.

17. The wind turbine of claim 15, wherein the bearing system comprises a rotational axis and is configured to transfer at least a major part of radial and axial loads to the bedplate, and wherein the flexible coupling member is configured to transmit a torque between the hub and the generator rotor and to compensate a radial, an axial, or an angular misalignment between the hub and the generator rotor.

18. The wind turbine of claim 15, wherein the generator further comprises a generator stator attached to the bedplate.

* * * * *